INVENTORS
WILLIAM C. DODSON, JR.
GEORGE R. LONG

BY

ATTORNEY

Nov. 21, 1967    W. C. DODSON, JR., ET AL    3,353,225
PROCESS OF FORMING NONWOVEN FABRIC WITH OPPOSED JETS
Filed July 5, 1966    4 Sheets-Sheet 2
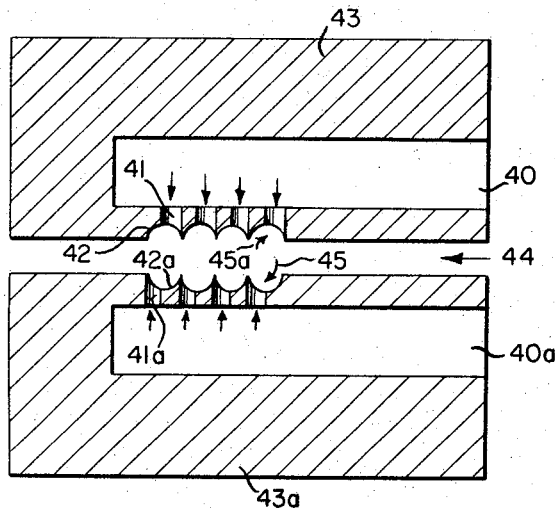
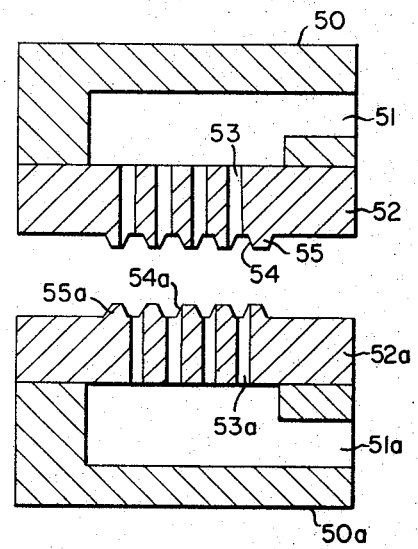
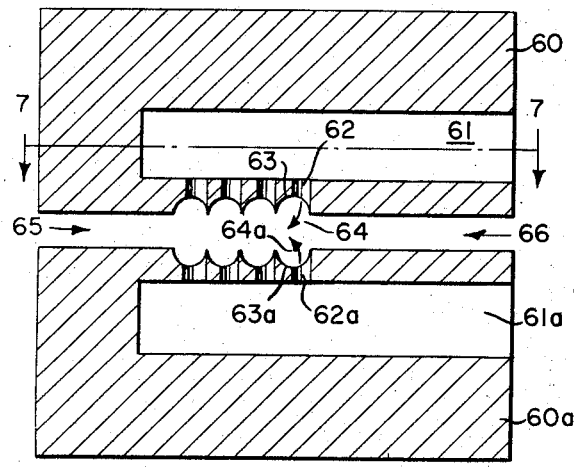
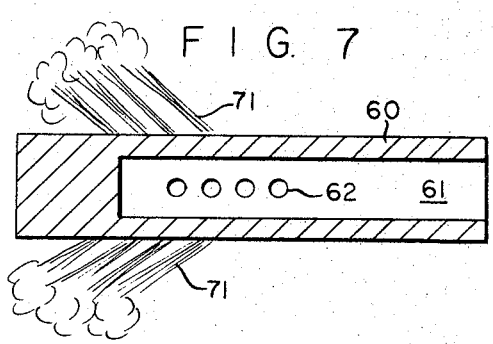
INVENTORS
WILLIAM C. DODSON, JR.
GEORGE R. LONG
BY
ATTORNEY

United States Patent Office 3,353,225
Patented Nov. 21, 1967

3,353,225
PROCESS OF FORMING NONWOVEN FABRIC
WITH OPPOSED JETS
William C. Dodson, Jr., and George R. Long, Wilmington, Del., assignors to E. I. du Pont de Nemours and Company, Wilmington, Del., a corporation of Delaware
Filed July 5, 1966, Ser. No. 563,934
6 Claims. (Cl. 19—161)

ABSTRACT OF THE DISCLOSURE

A process for producing patterned nonwoven fabric directly from loose fibrous layers with guided high velocity streams jetted from orifices of jet devices having opposed face portions which are spaced to provide a treatment zone and are grooved to guide the outflow of jetted fluid along bilateral paths, the fibrous sheet being moved between the jet devices in a direction transverse to the grooves to form a ladder-like pattern of parallelized fibers arranged in a row and extending between interentangled and compacted fiber groupings at the row sides.

---

This is a continuation-in-part of our application Ser. No. 482,128, filed Aug. 24, 1965, and now abandoned.

This invention relates to a novel method and apparatus for imparting coherence to a sheet of fibers. More particularly, it relates to a novel jet treatment with fluid for interentangling fibers in a fibrous sheet to form a patterned, coherent nonwoven fabric.

Fluid treatment of fibrous sheets has been used to re-orient fibers in the sheet. For example, gaseous blasts have been impinged against glass strands supported on a screen in the form of a sheet of overlapping strand loops to reorient some of the strand loops downwardly into the sheet. The strands in such products are not arranged in any pattern by the treatment. Liquid streams have been used for a similar purpose. In another process, apertures are formed in a sheet of fibers by passing a stream of gas through a perforate surface to blow away fibers in areas corresponding to the perforations while the sheet of fibers is held against an imperforate surface. Sprays of water have also been used to rearrange fibers held between a screen and a perforated plate to form a sheet having apertures. A binder is applied to the apertured products obtained by the above-described prior-art processes in order to impart strength and coherence to the structures.

The present invention provides a process and apparatus for preparing patterned coherent structures directly from loose fibrous layers, without the use of binders or adhesives, by treatment with high velocity streams of fluid such as air or steam. The present invention further provides for the production of patterned coherent structures by treatment with fluid streams without using a patterning plate or supporting member. In addition, the present invention provides such a process for uniting one or more layers of sheet material into a coherent structure. These and other advantages will become apparent in the course of the following specification and claims.

In accordance with the present invention, a nonwoven sheet of loose fibers is treated with coordinated streams of fluid to impart a pattern and coherency simultaneously to the sheet. Briefly, the process involves subjecting the sheet to opposed high velocity streams of fluid under flow conditions which simultaneously effect an interlooping and parallelizing action on the fibers in the path of the streams. Proper flow conditions are achieved by passing the sheet between a pair of jet devices by moving the sheet and/or the jet devices, each jet device having (1) an internal fluid supply plenum, (2) a series of small holes, aligned in the direction of movement of the sheet and perpendicular to the face of the jet device, for discharging coaligned fluid streams from the fact of the jet device against the sheet, and (3) an exit face (preferably grooved) which is arranged to direct outflow of the fluid along transverse paths against the sheet. The resulting products have a patterned row, corresponding to the path of the fluid streams, comprising generally parallel fibers which are twisted or looped over one another and are compacted with respect to one another particularly along the edges of the row.

More specifically, the process of the present invention comprises moving an initial sheet of loose fibers between a series of opposed fluid streams directed along a predetermined path across the sheet, the streams exerting successive vertical impingement force components which act on the sheet perpendicular to the plane of the sheet and horizontal force components which act in the plane of the sheet in opposed directions generally transverse to the direction of movement of the sheet.

The term "sheet" as used herein includes any batt or web of loose fibers, arranged haphazardly or in alignment. The fibers should be loosely arranged in the initial sheet, i.e., they should be free to move about in response to the forces created by the fluid streams.

The term "fiber" includes both natural and synthetic staple fibers and continuous filaments, either straight or crimped, of types commonly employed in textile uses, including blends thereof.

In a preferred embodiment of this invention, the process is applied to a sheet of randomly disposed continuous filaments to insert patterned rows at spaced intervals across the sheet, the patterned rows being separated by areas of randomly arranged filaments, to form a nonwoven fabric. The interlooping, aligning and compaction of fibers in the patterned row impart coherency and strength to the fabric. The process may be applied to selected areas of the sheet or to substantially the entire sheet, depending on the effect desired.

In accordance with another embodiment of the present invention, the process is used to join two or more sheets together. The sheets may be treated over substantially their entire areas to form a laminated fabric or their ends may be overlapped and treated at the overlap to join the two lengths into a continuous single length. For example, to join two ends of continuous-filament bundles or tows, the ends are spread out into flat sheets, placed one on top of the other and treated so that the opposed fluid streams pass across the sheets transverse to the direction of alignment of the filaments, whereby the interlooping and twisting of the filaments over and about one another effects a joint strong enough to permit the joined tows to be processed as a single continuous tow.

In operating the process of the present invention, the initial sheet of fibers is preferably passed between a pair of identical jet devices which are positioned facing each other with just sufficient clearance for the sheet to pass therebetween. A preferred jet device has grooves in the face adjacent the sheet with a single fluid exit-hole drilled perpendicular to the face of the jet device in each groove. The sheet is moved between the jet devices in a direction transverse to the grooves so that it is subjected to opposed fluid streams emerging from the holes in successive grooves. The streams exiting from the holes in the top jet device exert a downward force component on the fibers at the top surface of the sheet and a similar opposed force component is exerted upwardly at the bottom surface of the sheet by the fluid streams exiting from the bottom jet device. Motion of the sheet relative to the fluid streams creates a dragging force component on the fibers as they move from stream to stream. Additional force components are exerted against the fibers in a horizontal direction, i.e., in the plane of the sheet, as a result of the bidirectional outflow of the fluid along the grooves of the jet device. The horizontal bidirectional forces move fibers parallel to one another and parallel to the grooves, and perpendicular to the path of travel of the fluid streams. At the same time, the vertical forces from above and below the sheet coupled with the dragging forces cause individual fibers and/or small groups of fibers to loop or twist about one another. As the opposed fluid streams traverse the sheet, they create a patterned row of interlooped and generally parallel fibers along their path of travel. The interlooping is particularly visible along lateral edges of a row where a compaction of the sheet is also observed. This compaction is believed to be due to the horizontal bidirectional components of force acting on the sheet of fibers to cause fiber-crossings, i.e., sites where two or more fibers cross one another in the initial sheet, to move laterally to the edges of the path followed by the fluid streams.

Various modifications in the flow pattern can be provided, without departing from the basic concepts of the present invention, to produce special effects. These involve the positioning of the fluid exit holes within the groove of the jet device and the alignment of the pair of jet devices with respect to one another, as will be explained in detail in the discussion accompanying the following figures.

FIGURES 4, 5 and 6 are sectional side views of other embodiments of jet devices of the present invention, the sections being taken as in FIGURE 1.

FIGURE 7 is a sectional view taken along lines 7—7 of FIGURE 6.

Figure 1:
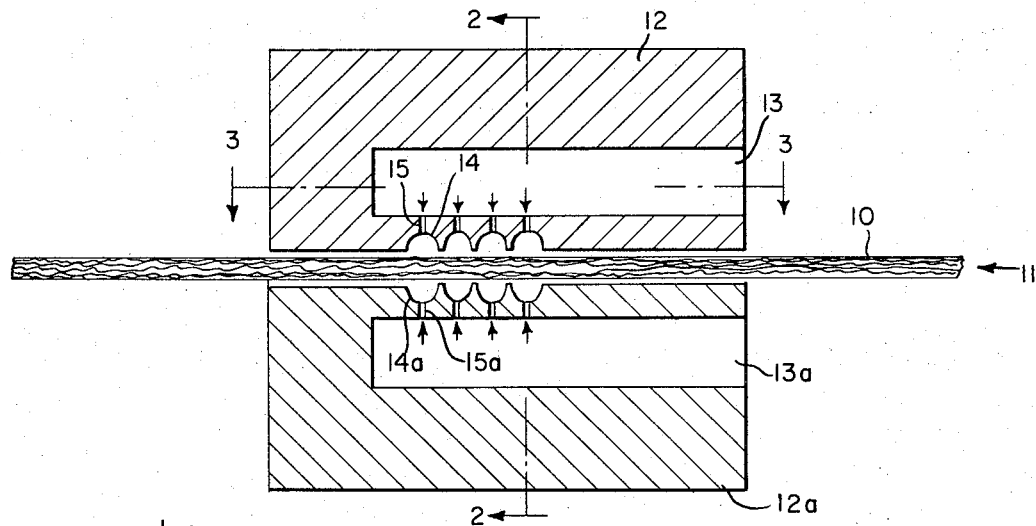
FIGURE 1 is a sectional side view taken along line 1—1 of FIGURE 2, showing one form of jet device and the positioning of two of them with respect to a sheet of material being treated.
Figure 2:
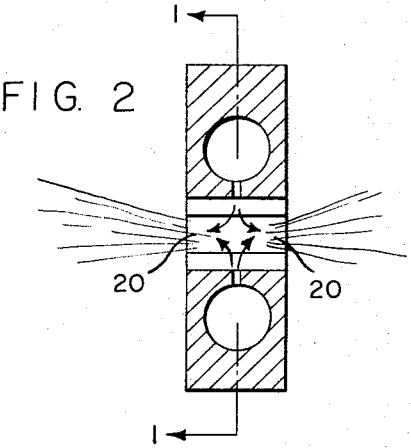
FIGURE 2 is a sectional view taken along line 2—2 of FIGURE 1.
Figure 3:
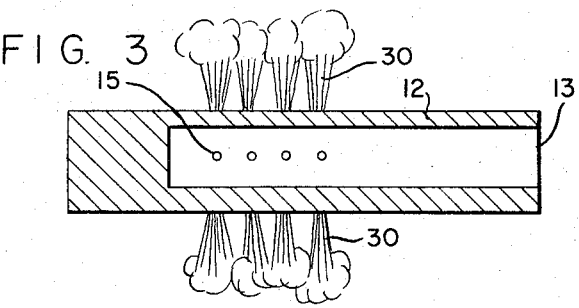
FIGURE 3 is a sectional view taken along line 3—3 of FIGURE 1.

In the embodiment of this invention illustrated in FIGURE 1, the initial sheet 10 is passed in the direction indicated by arrow 11 between a pair of opposed jet devices 12 and 12a. The devices have fluid supply passages 13 and 13a, faces having a number of grooves 14 and 14a, and fluid exit-holes 15 and 15a drilled in the grooves, one hole per groove. Care is taken to align the jet devices so that they are spaced an equal distance apart with their grooves parallel to one another and with their exit-holes in alignment. Optimum alignment for producing the best patterning can be effected by approximately aligning the jet devices visually and then, while supplying steam to the devices, adjusting their positions relative to one another until a horizontal bilateral outflow of steam of uniform intensity is observed exiting from the grooves. The bilateral horizontal outflow of fluid is shown at 20 in FIGURE 2. In FIGURE 3, the bilateral outflow 30 exiting from the grooves 14 is shown. As the sheet passes between the jet devices in the direction 11 (FIGURE 1), vertical forces exerted by the fluid streams from holes 15 and 15a coupled with forces created by the motion of the sheet cause fibers to move from one surface of the sheet toward the other and to become looped about one another in so doing. The bilateral horizontal forces from the outflow of fluid along the grooves 14 and 14a are at the same time aligning the fibers parallel to the grooves and perpendicular to the direction in which the sheet is moving. Fiber crossings present in the area of the initial sheet being treated are pushed aside by the bilateral horizontal forces and compacted with other fibers at the edge of the treatment area, i.e., at the ends of the grooves.

Although FIGURE 1 shows an embodiment in which the exit holes 15 and 15a are drilled perpendicular to the face of the jet device along the center line of the grooves 14 and 14a, it has been found that off-center hole locations are generally preferable. In the embodiments shown in FIGURES 4 and 5, the fluid exit-holes are drilled perpendicular to the face of the jet device but to one side of the center line of the groove, and the jet devices are arranged so that the fluid exit-holes of the top and bottom devices are on opposite sides of the center lines of the grooves.

Referring to FIGURE 4, fluid is introduced under pressure into passages 40 and 40a and exits from holes 41 and 41a drilled in grooves 42 and 42a of jet devices 43 and 43a. With the jet devices in the position shown in FIGURE 4, it can be seen that each of the holes 41 is to the right of the center line in grooves 42, whereas holes 41a are to the left of the center lines of grooves 42a. The jet devices are first approximately aligned in the position illustrated and are then adjusted to provide optimum alignment by observation of the outflow of steam as described in connection with FIGURES 2 and 3. When the proper bilateral horizontal outflow is effected, the sheet to be treated is passed between the jet devices either from the direction indicated by arrow 44 or from the reverse direction. The arrangement of the jet devices is such that the sheet is subjected to successive pairs of fluid streams which are opposed but slightly off-set with respect to one another in the direction of travel of the sheet. Fluid exiting from holes 41 tends to flow in the direction indicated by arrow 45, while fluid from hole 41a follows the direction 45a, and it is believed that a torque-like flow pattern is thereby generated within the area defined by opposed grooves of the jet devices. Products obtained by treating sheets with this embodiment, in contrast with the embodiment of FIGURE 1, are characterized by a more distinct pattern-definition and a greater twisting and interlooping of fibers about one another to form tightly entangled groups along the path of treatment.

Another preferred apparatus is shown in FIGURE 5 and operates in the same manner as the apparatus of FIGURE 4 to create a torque-like flow pattern. The jet devices comprise body members 50 and 50a with fluid passages 51 and 51a and orifice plates 52 and 52a. The orifice plates are fabricated from sections of gear rack by drilling fluid exit-holes 53 and 53a to intercept the faces 54 and 54a of teeth 55 and 55a.

In FIGURE 6 is shown still another embodiment of opposed jet devices which is useful when using gaseous fluid for creating a knit-stitch type of interlooping of fibers along the path of treatment. Opposed jet devices 60 and 60a are provided with gas supply passages 61 and 61a. Gas exit-holes 62 and 62a are drilled perpendicular to the face of the jet device and to one side of the center line of the grooves 63 and 63a. The jet devices are positioned so that the gas exit-holes of the mated top and bottom grooves are approximately opposite each other. With the jet devices arranged in this way, gas exiting from hole 62 tends to flow in the direction indicated by arrow 64 and gas exiting from hole 62a follows the path indicated at 64a. Out flow of gas, as observed with steam, is as shown in FIGURE 7 when the jet devices are properly aligned. In the previous embodiments discussed in connection with FIGURE 3, the bilateral horizontal outflow of gas is generally parallel to the grooves. When the jet devices are arranged as in FIGURE 6, the bilateral horizontal outflow of gas is swept back at an angle to the grooves as indicated at 71 in FIGURE 7, corresponding to the flow direction indicated at 64 and 64a in FIGURE 6.

With the jet devices properly aligned to produce the outflow pattern of FIGURE 7, different effects are obtained depending on the direction of passage of the sheet through the jet devices. When the sheet is passed in the direction indicated by arrow 65 in FIGURE 6, i.e., opposed to the direction of gas outflow, fibers tend to be successively looped over one another to form an entanglement resembling the interlooping of conventional knitting. This type of interlooping will be designated a knit-stitch; it is shown schematically in FIGURE 10a. When the sheet is passed between the jet devices in the direction indicated by arrow 66, the products are of the general type discussed in connection with FIGURES 1 to 5 and depicted in FIGURE 10.

Figure 8:
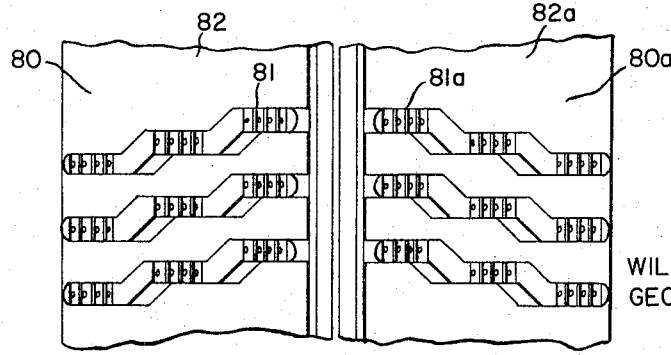
FIGURE 8 is a face view of apparatus in which a plurality of jet devices are combined for treating a sheet to impart a number of patterned rows simultaneously.
Figure 9:
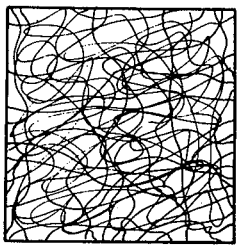
FIGURE 9 is a schematic top view illustrating a sheet of random fibers for use as initial material in the preparation of products of the present invention.

For the production of nonwoven fabrics, patterned rows are preferably inserted at closely-spaced regular intervals across the sheet. This can be done by successively inserting each patterned row by using one pair of opposed jet devices and moving them across the sheet at the desired spacing. Alternatively, a plurality of pairs of opposed jet devices can be combined in one apparatus to insert a number of patterned rows in the sheet simultaneously. Such an arrangement is shown in FIGURE 8 wherein 80 and 80a are the top and bottom jet devices shown in face view. In operation, the jet devices would be aligned as described in connection with FIGURES 1–7. In the grouping of jet devices as shown in FIGURE 8, the grooved faces 81 and 81a should be spaced from the bases 82 and 82a and from each other to provide exhaust space for the fluid exiting from the grooves. In the arrangement shown in FIGURE 8, there are nine pairs of grooved faces 81 and 81a permitting the simultaneous production of nine patterned rows across the sheet. Each face 81 and 81a has four grooves, each having a hole drilled in it perpendicular to the face and to one side of the center line of the groove. The grouping is such that the jet devices can be aligned opposite one another as described in connection with either FIGURE 4 or FIGURE 6. Groove length is 0.125 inch and the lateral separation between grooved faces is twice the groove length, which is the preferred minimum separation. The grooved faces 81 and 81a are spaced 0.5 inch from the bases 82 and 82a which provides adequate space for fluid to be exhausted from the device.

Suitable jet devices of the types shown in FIGURES 1, 4, 6 and 8 have the following dimensions:

| | |
|---|---|
| Groove diameter (inches) | 0.031 to 0.125. |
| Groove length (inches) | 0.125 to 0.5. |
| Center-to-center distance between grooves (inches) | 0.031 to 0.125. |
| Gas exit-hole diameter (inches) | 0.016 to 0.05. |
| Length/diameter ratio of gas exit holes | 4/1. |
| Hole arrangement | Perpendicular to face; counterbored to provide conical inlet. |

Gear racks having the following dimensions are suitable for making jet devices of the type shown in FIGURE 5.

| | |
|---|---|
| Gear teeth (No./inch) | 20.4 to 10.2 |
| Center-to-center distance between teeth (in.) | 0.049 to 0.098 |
| Gear-tooth depth (in.) | 0.04 to 0.07 |
| Groove length (in.) | 0.125 to 0.5 |
| Gas exit-hole diameter (in.) | 0.016 to 0.05 |
| Gear tooth angle | 14.5° to 20° |

When using jet devices with the above dimensions for preparing strong, coherent patterned nonwoven fabrics, it has been found that each jet device should have at least two grooves with corresponding gas exit-holes, and optimum results are obtained with four. Preferably, the gas exit-hole diameter does not exceed one-half the groove diameter. With such jet devices, initial sheets of continuous filaments and/or staple fibers, weighing up to 3.5 oz./yd.$^2$, are patterned effectively with 40 to 95 p.s.i.g. air. In general, increasing the gas pressure gives better pattern definition. Heating the gas also improves processibility of sheets having fibers which are rendered more pliable by the heat and hence are more responsive to the action of the gas blasts. Steam has been found to be a highly effective treating medium and has been used to pattern initial sheets weighing up to 10.5 oz./yd.$^2$.

The fluid used should, of course, be selected according to the nature of the fibers in the sheet to be patterned and the effect desired. Suitable gases include wet steam, saturated steam, superheated steam, unheated compressed air, heated compressed air and other gases, e.g., nitrogen directly from a cylinder. Liquids, preferably water, may also be substituted for gases in the jet devices of the dimensions described above. When liquids are used, fluid exit holes and grooves of smaller dimensions may be used and permit preparation of more closely spaced patterned rows.

The following examples illustrate the application of the process of the present invention to the production of the process of the present invention to the production of nonwoven fabrics but are not intended to be limitative.

Tensile properties are measured on an Instron tester at 70° F. and 65% relative humidity. Strip tensile strength is determined for a sample 1 inch wide, using a 5-inch sample length between jaws of the tester and elongating at 100% per minute. Drape flex or bending length is determined by using a sample 1 inch wide and 6 inches long and moving its slowly in a direction parallel to its long dimension so that its end projects from the edge of a horizontal surface. The length of the overhang is measured when the tip of the sample is depressed under its own weight to the point where the line joining the tip to the edge of the platform makes an angle of 41.5° with the horizontal. One-half of this length is the bending length of the specimen, reported in centimeters. Thickness is measured with Ames thickness gauges. Tongue tear strength is measured in accordance with ASTM D–39 except that a sample 2.5 inches by 2 inches and having a 1.25-inch slit is used.

*Example 1*

This example illustrates the preparation of a nonwoven fabric having adjacent patterned rows across the fabric using jet devices of the type shown in FIGURE 6.

The initial sheet is a web of continuous, polyethylene terephthalate filaments which are disposed substantially at random. Filament denier is 2.9 and web weight is about 3 oz./yd.$^2$. The filaments are capable of about 7.6% spontaneous elongation when heated in 100° C. water. Preparation of such spontaneously elongatable filaments is taught in Kitson et al. U.S. Patent No. 2,952,879, issued Sept. 20, 1960. Prior to treatment, the web is moistened lightly with a fine water spray to help hold the filaments in place.

Dimensions for each jet device are as follows:

| | |
|---|---|
| Groove diameter inch | 0.035 |
| No. of grooves do | 4 |
| Groove length do | 0.125 |
| Center-to-center distance between grooves do | 0.035 |
| Gas exit-hole diameter do | 0.020 |
| Overall dimensions of jet device, 1 x 0.25 x 0.531 inch. | |

Two jet devices are arranged with their grooved faces 0.125 inch apart and with their grooves and holes arranged as described in connection with FIGURE 6. Starting at one edge of the web, and proceeding across it, adjacent patterned rows are inserted in the web at a frequency of 10 patterned rows per inch of fabric. Each row is made by passing the web once in the direction indicated by arrow 65 in FIGURE 6 and once in the direction by arrow 66. The treatment is carried out with steam supplied at 80 p.s.i.g. pressure to the jet devices.

A second web is treated in the same way except that 13.5 patterned rows per inch are inserted.

The coherent patterned fabrics so obtained are then pressed between 30 mesh screens at 200° C. for 1 minute at 25 p.s.i. pressure. This develops the spontaneous elongation of the filaments, causing them to buckle on one another in the openings of the screen, thereby imparting bulk to the fabric. The resulting fabric is washed, ironed and tested. Physical properties of the fabric having 10 rows per inch are as follows:

|  | MD | Bias | XD |
|---|---|---|---|
| Weight (oz./yd.$^2$) | 3.4 | 3.4 | 3.4 |
| Strip Tensile Strength (lb./in./oz./yd.$^2$) | 5.4 | 7.3 | 10 |
| Elongation (percent) | 177 | 142 | 105 |
| Tongue Tear Strength (lb./oz./yd.$^2$) | 4.3 | 3.8 | 3.8 |
| Bending length (cm.) | 2 | 2.1 | 2.3 |

Properties of the fabric having 13.5 rows per inch are as follows:

|  | MD | Bias | XD |
|---|---|---|---|
| Weight (oz./yd.$^2$) | 3.1 | 3.1 | 3.1 |
| Strip Tensile Strength (lb./in./oz./yd.$^2$) | 5.6 | 6.8 | 9.9 |
| Elongation (percent) | 174 | 139 | 111 |
| Tongue Tear Strength (lb./oz./yd.$^2$) | 4.2 | 3.0 | 2.9 |
| Bending length (cm.) | 1.9 | 1.8 | 2.1 |

MD values are measured in the direction of the patterned rows; XD values are 90° thereto and bias values are 45° thereto.

Figure 10:
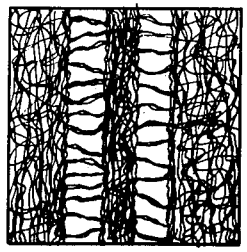
FIGURES 10 and 10a are schematic top views of products of the present invention.
Figure 10A:
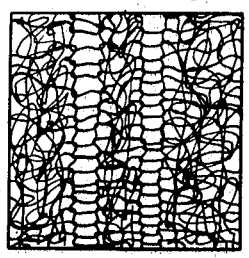
Figure 11:
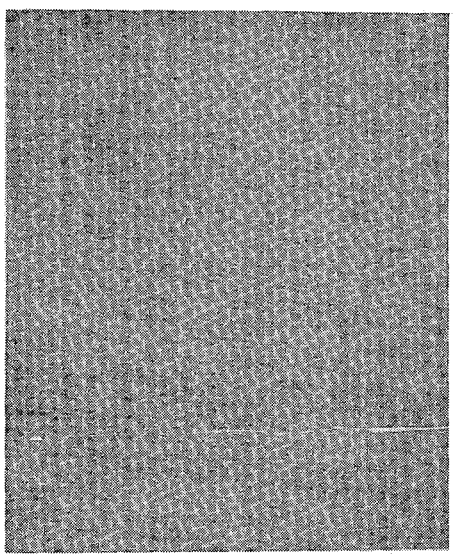

Although the arrangement of the jet devices is such that a knit stitch of the type indicated in FIGURE 10a could be produced, the fact that the web is passed once in direction 65 and then once in direction 66 (FIGURE 6) leads to production of a patterned row of the type shown schematically in FIGURE 10. The fabric is soft, strong and drapable and is shown at about 1× in FIGURE 11. Because of the ladder-like arrangement of the patterned rows, the fabric has a desirable fabric-like stretch in the bias direction.

*Example 2*

The procedure of Example 1 is repeated to impart 10 patterned rows per inch across an initial sheet. The patterned sheet is then turned 90° with respect to its original direction of passage and passed between the jet devices to insert 10 patterned rows per inch at right angles to the original rows. The fabric obtained in this manner has fibers arranged in a pattern resembling an open-mesh woven fabric.

*Example 3*

This example illustrates the joining of several layers of fibers to produce a nonwoven fabric.

The initial sheet is a web of randomly disposed, continuous, white, polyethylene terephthalate filaments of 3 denier per filament on which a very light layer of generally parallel filaments is laid. The latter filaments are of the same type as those in the first mentioned web but are black.

Figure 12:
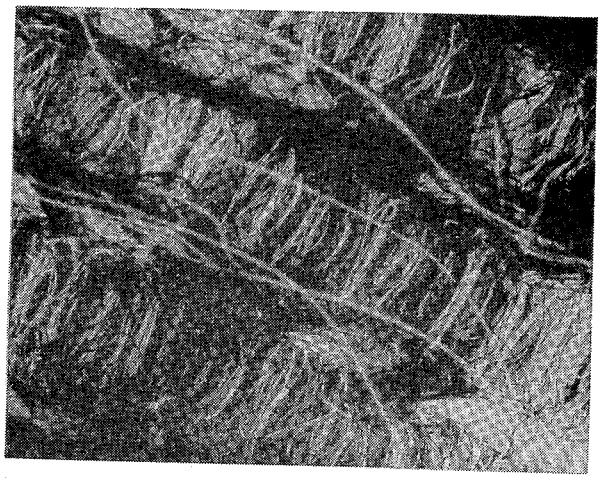
Figure 13:
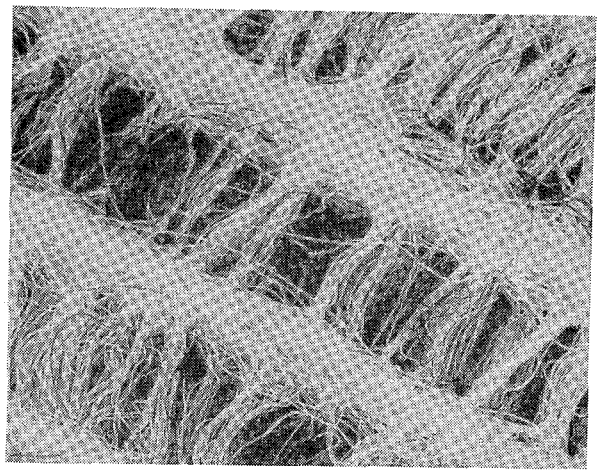

Jet devices having the same dimensions as those listed in Example 1 are used but the pair of jet devices are arranged as shown in FIGURE 4. Superheated steam at 80–100 p.s.i.g. is supplied to the jet devices. The assembly is passed between the opposed jets so that the generally parallel, black fibers are in the direction 90° to the direction of passage through the treating device. Treatment is repeated across the assembly to insert 10 patterned rows per inch across the fabric. A strong coherent fabric is produced in which both layers of fiber are integrated into a unitary structure. The two faces of the fabric are shown in plan view at about 15× magnification in FIGURES 12 and 13. The penetration of fibers from one face of the fabric to the other is evident in these figures.

*Example 4*

This example illustrates the preparation of a patterned nonwoven fabric using air as the gas.

The initial sheet is a 2.5 oz./yd.$^2$ web of randomly disposed, polyester, continuous filaments of 3 denier per filament.

The jet devices used are of the type and arrangement shown in FIGURE 5. Overall dimensions of each jet device are 1 x 0.25 x 0.625 inch. Groove length is 0.125 inch and there are four grooves, each having a gas exit-hole 0.024 inch in diameter drilled off-center therein perpendicular to the face of the jet device. Center-to-center spacing of the grooves is 0.065 inch. Air at 80 p.s.i.g. pressure and heated to 110° C. is supplied to the jet devices. The sheet is treated to impart 10 patterned rows per inch. A strong, coherent fabric of the type shown schematically in FIGURE 10 is obtained. Its properties are given below:

|  | MD | XD |
|---|---|---|
| Strip Tensile Strength (lb./in./oz./yd.$^2$) | 3.1 | 2.5 |
| Elongation (percent) | 130 | 150 |
| Tongue Tear Strength (lb./oz./yd.$^2$) | 1.8 | 1.6 |

*Example 5*

This example illustrates the preparation of a nonwoven fabric from staple fibers.

The initial sheet is a batt of randomly disposed, 3 denier per filament, polyethylene terephthalate, staple fibers having a length of about 1 inch (2.54 cm.).

The jet device apparatus described in Example 3 is used but it is supplied with air at 35–40 p.s.i.g. pressure instead of steam. The sheet is processed to introduce patterned rows adjacent one another across the sheet. The fabric obtained is of the type shown schematically in FIGURE 10.

*Example 6*

This example illustrates preparation of a nonwoven fabric using jet devices of the type shown in FIGURE 1.

The jet devices have 4 grooves with a 0.024-inch gas exit-hole drilled in each groove perpendicular to the jet face on the center line of the groove. Groove diameter is 0.063 inch and groove length is 0.25 inch. Center-to-center distance between grooves is 0.063 inch. Overall dimensions of each jet device are 1.5 x 0.25 x 0.5 inch. Using the jet apparatus shown in FIGURE 1, supplied with 90 p.s.i.g. air, a sheet of randomly-disposed continuous filaments is treated to insert patterned rows across the sheet at about 0.3 inch intervals. The resulting nonwoven fabric is strong and coherent and is patterned as shown schematically in FIGURE 10.

*Example 7*

This example illustrates operation of the process to insert a knit-like stitch in a sheet.

The initial sheet is a web of randomly disposed, polyester, continuous filaments of 3 denier per filament.

Figure 14:
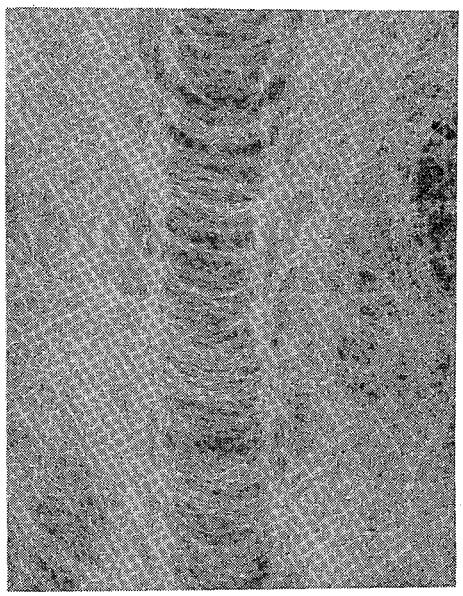
FIGURES 11–14 are face view photographs of products obtained as described in Examples 1, 3 and 7.

Each jet device is of the type shown in FIGURE 5, having four grooves at a center-to-center spacing of 0.065 inch, each groove being 0.125 inch in length and having a gas exit-hole 0.024 inch in diameter drilled off-center therein perpendicular to the face of the jet device. The arrangement of the pair of jet devices differs from that shown in FIGURE 5 in that the gas exit-holes are off-center on the same sides of the grooves so that the gas exit-holes of the pair of devices are aligned approximately opposite to each other as shown in FIGURE 6. Using air at 92 p.s.i.g. pressure, the sheet is passed once between the jet elements in the direction indicated by arrow 65 of FIGURE 6, i.e., opposed to the swept back outflow of gas from the jets discussed previously. The patterned row obtained in the sheet in this fashion exhibits a characteristic, successive looping of fibers along the path of the jet, producing a knit stitch of the type indicated schematically in FIGURE 10a. The structure is shown in more detail in FIGURE 14, a photomicrograph at 6× magnification.

*Example 8*

This example illustrates preparation of bulky nonwoven fabrics suitable for use as batting for sleeping bags, quilts and the like.

A 2-oz./yd.$^2$ web of 13 denier per filament, spontaneously elongatable, fibers is treated as described in Example 1 to insert patterned rows 0.5 inch apart. These patterned rows firmly entangle the fibers of the sheet together along parallel stitch-like lines 0.5 inch apart. The sheet is then heated to develop the spontaneous elongation of the fibers by placing the sheet in a press between platens heated to 200° C. No pressure is placed on the sheet which would restrain development of bulk. This treatment causes bulking of the sheet in the area between patterned rows. The resulting product is stable and possesses good bulk and resilience.

*Example 9*

This example illustrates preparation of a patterned nonwoven fabric using a liquid as the treating fluid.

The initial sheet is a 3 oz./yd.$^2$ web of randomly disposed, polyester, continuous filaments of 3 denier per filament.

Jet devices having the dimensions described in Example 1 are used and are positioned with their grooves and holes arranged as described in connection with FIGURE 4. Starting at one edge of the web portion and proceeding across it, adjacent patterned rows are inserted in the web at a frequency of 10 patterned rows per inch of fabric. The treatment is carried out using water at 65 p.s.i.g. The patterning is of the type shown in FIGURE 10.

Similar products are also made using the jet devices and arrangement described in Example 4, and using water at 65 p.s.i.g., and 95 p.s.i.g.

In the jet devices of the present invention, each pair of upper and lower grooves and associated fluid exit holes produces a separate zone of patterning flow, which zone approximately corresponds to the length of the groove. Multiple zones on coalignment cooperate to produce the novel patterning in the sheet being treated. When the relative motion between the sheet and jet devices is parallel to the above mentioned coalignment, a maximum patterning effect is produced. When the motion is at a small angle to the coalignment, a pattern is produced as long as the paths of the successive zones of patterning flow overlap by at least about 50%. By operating within this limitation and altering the direction of relative motion between the sheet and the jet devices to follow a curved path, curved patterned rows and even closed loops have been produced in a sheet. However, for forming curved patterns of a given radius of curvature, a preferred device has its fluid exit holes and associated grooves coaligned along a line corresponding to the given radius of curvature.

When the process of the present invention is used for joining tow or other filament bundles, such as yarn, the jet devices should provide 2 or more counteracting streams of fluid, and the material should preferably be treated in the direction generally perpendicular to the alignment of the filaments. Nylon tows of 2.3 d.p.f. and 618,000 total denier; 3 d.p.f. and 430,000 total denier; and 18 d.p.f. and 444,000 total denier have been joined by the process and apparatus of this invention and joints obtained had strengths of at least 200 lbs. Tows of polyester filaments of 1.5 to 3 denier per filament and a total denier up to 1.1 million have also been joined by this process. When continuous filament yarn is being joined, the absence of twist facilitates the joining process, although a moderate degree of twist may be tolerated.

Since many different embodiments of the invention may be made without departing from the spirit and scope thereof, it is understood that this invention is not limited to the specific illustrations disclosed.

We claim:

1. The process for preparing patterned coherent structures directly from loose fibrous layers which comprises, passing a loose fibrous layer between opposed high velocity streams of fluid jetted substantially perpendicularly against opposite faces of the layer to simultaneously interloop and parallelize the fibers, jetting a succession of said opposed streams coaligned along a direction of treatment of the layer and simultaneously guiding the outflow of said jetted fluid against the layer along bilateral paths transverse to said direction of treatment to form a row having a pattern characterized by a center portion of transverse parallelized fibers and by interlooped fibers compacted along the sides of the row to provide a coherent structure.

2. A process as defined in claim 1 comprising simultaneously treating the layer at spaced intervals across the layer to form rows of transverse parallelized fibers and to form compacted fiber groupings between the rows.

3. A process as defined in claim 1 comprising directing the outflow of jetted fluid outward from the center of the patterned row along paths swept back at an opposed angle to the direction of treatment of the layer to form an entanglement resembling knitting along the sides of the row.

4. The process for forming a patterned row in a nonwoven sheet of loose, randomly arranged fibers which comprises, treating an area of the sheet along a line by passing the sheet between a pair of fluid streams which are opposed and slightly offset with respect to each other in the direction of treatment of the sheet to form a torque-like flow pattern about an axis in the treatment area transverse to the direction of treatment, guiding the fluid outflow in opposite directions from the treatment area to compact fibers along the edges of the treatment area and to parallelize groups of fibers transversely between the compacted edges, and subjecting the treatment area to successive pairs of opposed fluid streams to form a row characterized by a ladder-like pattern of twisted parallelized fiber groups extending transversely of the row between compact groups of randomly interlooped fibers which extend along the edges of the row to provide a coherent structure.

5. A process as defined in claim 4 comprising treating the sheet at closely-spaced regular intervals across the sheet to provide a nonwoven fabric having substantially parallel patterned rows.

6. A process as defined in claim 5 comprising treating the sheet at closely-spaced regular intervals in a first direction and then in a second direction at right angles to provide a nonwoven fabric having a pattern resembling an open-mesh woven fabric.

References Cited

UNITED STATES PATENTS

| | | | |
|---|---|---|---|
| 2,862,251 | 12/1958 | Kalwaites | 19—161 |
| 2,981,999 | 5/1961 | Russell | 28—1 |
| 3,018,521 | 1/1962 | Harmon | 19—150 |
| 3,040,412 | 6/1962 | Russell | 28—72 |
| 3,056,406 | 10/1962 | Ness. | |
| 3,135,023 | 6/1964 | Kalwaites | 19—150 |
| 3,150,416 | 9/1964 | Such | 19—161 |
| 3,214,819 | 11/1965 | Guerin | 28—72.2 |
| 3,230,584 | 1/1966 | Kalwaites | 19—150 |

FOREIGN PATENTS 17,199   6/1904   Great Britain.

ROBERT R. MACKEY, *Primary Examiner.*